Patented June 27, 1950

2,513,240

UNITED STATES PATENT OFFICE 2,513,240

WELDED STEEL PIPE

Erle G. Hill, Wheeling, W. Va., assignor to Wheeling Steel Corporation, Wheeling, W. Va., a corporation of Delaware No Drawing. Application January 10, 1949,
Serial No. 70,145

2 Claims. (Cl. 75—123)

This invention relates to furnace-welded, threaded pipe such as domestic gas and water pipe and to a method of making such pipe. By "furnace-welded" I mean butt-welded or lap-welded pipe made by heating skelp to welding temperature in a furnace and drawing it through a forming bell or rolling it through welding rolls.

It has been the practice to make such pipe from Bessemer steel, largely because of its good welding properties and its excellent threading properties. Other steels can be satisfactorily machine threaded at the pipe producing mill but Bessemer steel is unique in that thread-cutting dies of the solid block type used by plumbers and householders will produce in Bessemer steel pipe smooth untorn threads with resulting tight joints.

Open hearth steel has not proved satisfactory because it does not have as good welding properties as Bessemer steel and is much more difficult to machine to produce a smooth thread.

In order for a steel to be suitable for the production of welded and threaded pipe which are to withstand high pressures of liquids or gases it is of course necessary that the steel possess sufficiently high physical properties, such as tensile strength and ductility, as to withstand the stresses to which it is subjected in fabrication, installation and use. It must be capable of being readily rolled into skelp and thereafter welded and formed into pipe. The weld must be sound, i. e., free from porosity or unwelded sections, in order to prevent leakage under the high pressures employed. The steel must be free-cutting so as to be capable of being threaded satisfactorily in the field with any type of threading equipment which may be employed.

My invention provides a pipe of open hearth steel having a unique combination of properties not heretofore obtainable with open hearth steel. It thus opens up new outlets to open hearth steel manufacturers. The product is superior to Bessemer pipe in certain of its physical properties and in uniformity and is equal to Bessemer pipe in welding and threading quality.

In accordance with my invention I add phosphorous, sulphur and nitrogen to basic open hearth steel to produce steel having the following composition ranges:

| | Per cent |
|---|---|
| Carbon | .05 to .10 |
| Manganese | .28 to .38 |
| Phosphorus | .040 to .085 |
| Sulphur | .040 to .060 |
| Nitrogen | .010 to 0.15 |

The balance of the steel is substantially all iron except for incidental impurities normally found in open hearth steel.

Best results are obtained when the carbon is between .06% and .08% and the manganese between .30% and .35%, the phosphorus, sulphur and nitrogen being within the ranges just given.

A steel to be satisfactory for the production of welded and threaded pipe must have characteristics which render it suitable from the standpoint of its physical properties, its weldability, its machinability and its rollability. Elements and ranges of elements which are suitable for one of these required properties often adversely affect other of the required properties. I have found that steel compositions within the relatively narrow ranges of ingredients above specified possess all of the properties required to satisfactorily make and use welded and threaded pipe but that if those ranges of ingredients are not adhered to difficulties are met either in the manufacture or in the use of the pipe or both.

The carbon in my steel is between about .05% and .10%, preferably between .06% and .08%. If the carbon is lower than .05% the steel has poor cutting qualities so that smooth threads required to make leak-proof joints cannot readily be cut in the field. If the carbon is above about .10% it decreases the weldability and unduly lowers the ductility of the pipe.

The phosphorus should be between about .040% and .085%. The phosphorus content of the steel greatly affects its weldability. The welding is carried out at a high temperature, usually in the neighborhood of 2500° F., employing a highly oxidizing flame. The skelp from which the pipe is formed is covered with scale which is magnetic iron oxide, $Fe_3O_4$. In order to obtain a good weld it is necessary that an oxidizing flame be employed so as to further oxidize this layer and cause it to flow off in a liquid stream during welding, thereby presenting clean surfaces of steel which are butted or lapped together in forming the weld. The steel must be of such composition that it is what is called in the trade a "wet" steel, i. e., one in which the "liquor" formed by oxidizing the $Fe_3O_4$ flows off in a thin liquid during welding. A factor which greatly influences the fluidity of the liquor formed in welding is the phosphorus content of the steel. It has been found that phosphorus within the limits above given produces the desired fluidity of the liquor formed during welding and aids in the production of a continuous sound weld. If the phosphorus is below about .040% it decreases the machinability of the steel, rendering the threading operation more difficult, whereas if it is above .085% the steel is likely to lack ductility and be unable to withstand shocks encountered during straightening, bending, fabrication or use of the pipe.

The sulphur in my steel is kept within the relatively narrow range of about .040% to 0.60%. If the steel contains less than about .040% sulphur it is not sufficiently free-cutting and if it contains over about 0.6% sulphur the sulphur tends to embrittle the steel, to increase segregation in the ingot and in the skelp and to produce a porous weld and the steel has rather poor rolling qualities.

The manganese in my steel is between about .28% and .38%, preferably between about .30% and .35%. The ratio of manganese to sulphur is at least 5:1 and preferably is about 6:1. Thus in my preferred steel the manganese is about .32% and the sulphur about .05%. If the manganese is not present in an amount of at least five times the sulphur, the sulphur is likely to cause overheating or burning of the steel at the weld, thereby producing a porous or otherwise imperfect weld which will not withstand high hydrostatic pressure. If the manganese content is too high the steel lacks the required ductility.

The nitrogen in my steel is between about .010% and .015%. The presence of nitrogen in the steel in this amount greatly improves the free-cutting quality of the steel. Thus the amount of sulphur which otherwise would be required in order to produce equivalent machinability can be kept much lower, thereby improving the rolling and welding characteristics of the steel. Nitrogen in amount below about .010% is relatively ineffective in increasing the machinability of the steel and nitrogen in amounts substantially exceeding .015% are likely to unduly harden the steel and after cold working reduce its ductility below the required values.

The phosphorus content required in my steel can be obtained by adding ferrophosphorus, the sulphur by adding stick sulphur or iron and manganese sulphides and the nitrogen by adding calcium cyanamide or ammonium sulphate to open hearth steel of normal analysis, these additions being made to the metal in the ladle. After the additions of phosphorus, sulphur, and nitrogen have been made the steel is poured into an ingot, the ingot is rolled into skelp, the skelp is formed and welded to produce pipe and the pipe is threaded.

It will be evident from the foregoing description that the invention permits making of high quality furnace-welded pipe from open-hearth steel, the steel having a unique and valuable combination of properties not heretofore attainable in such steels. Thus mills having no capacity for making Bessemer steel or insufficient capacity for making Bessemer steel but having sufficient capacity for making open hearth steel can fulfill their welded and threaded pipe requirements by employing open hearth steel, thereby adding flexibility to the operation of the mill.

The invention is not limited to the preferred embodiment but may be otherwise embodied or practiced within the scope of the following claims.

I claim:

1. A furnace-welded pipe of basic open hearth steel containing about .05% to .10% carbon, about .28% to .38% manganese, about .040% to .085% phosphorus, about .040% to .060% sulphur, and about .010% to .15% nitrogen, the balance being substantially all iron except for incidental impurities normally found in open hearth steel, the pipe being characterized by a sound weld and good field-threading properties.

2. A welded and threaded pipe of basic open hearth steel containing about .06% to .08% carbon, about .30% to .35% manganese, about .040% to .085% phosphorus, about .040% to .060% sulphur, and about .010% to .015% nitrogen, the balance being substantially all iron except for incidental impurities normally found in open hearth steel, the pipe being characterized by a sound weld and good field-threading properties.

ERLE G. HILL.

REFERENCES CITED

The following references are of record in the file of this patent:

UNITED STATES PATENTS

| Number | Name | Date |
|---|---|---|
| 2,319,635 | Saylor | May 18, 1943 |

OTHER REFERENCES

Making, Shaping, and Treating of Steel, 5th edition, pages 1315 to 1319, 1367, and 1368. Edited by Camp and Francis. Published in 1940 by the Carnegie-Illinois Steel Corporation, Pittsburg, Pa.

Certificate of Correction

Patent No. 2,513,240 June 27, 1950

ERLE G. HILL

It is hereby certified that errors appear in the printed specification of the above numbered patent requiring correction as follows:

Column 3, line 8, for "0.60%" read *.060%*; line 11, for "0.6%" read *.06%*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*